United States Patent
Zhu et al.

(10) Patent No.: US 8,979,283 B2
(45) Date of Patent: *Mar. 17, 2015

(54) OPTICAL APPARATUS

(75) Inventors: Zhong-Ren Zhu, Taoyuan Hsien (TW); Mao-Shan Hsu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 175 days.

This patent is subject to a terminal disclaimer.

(21) Appl. No.: 13/617,871

(22) Filed: Sep. 14, 2012

(65) Prior Publication Data

US 2013/0335713 A1    Dec. 19, 2013

(30) Foreign Application Priority Data

Jun. 15, 2012  (CN) .......................... 2012 1 0198897

(51) Int. Cl.
| | | |
|---|---|---|
| *G03B 21/14* | (2006.01) | |
| *G02B 7/182* | (2006.01) | |
| *G03B 21/00* | (2006.01) | |
| *G03B 21/28* | (2006.01) | |

(52) U.S. Cl.
CPC .............. *G02B 7/1824* (2013.01); *G03B 21/00* (2013.01); *G03B 21/14* (2013.01); *G03B 21/28* (2013.01)
USPC .................. 353/119; 353/37; 353/38; 353/98; 353/101; 248/121; 248/398

(58) Field of Classification Search
USPC ............. 353/30, 31, 34, 37, 38, 98, 101, 102, 353/119; 248/13, 121, 398, 451, 453, 455, 248/923, 552, 289.11, 917; 348/743–747; 349/5, 7–9
See application file for complete search history.

(56) References Cited

U.S. PATENT DOCUMENTS

| | | | |
|---|---|---|---|
| 6,641,267 B2* | 11/2003 | Ohishi et al. ..................... 353/61 |
| 6,685,149 B1* | 2/2004 | Chang ......................... 248/188.2 |
| 6,773,115 B2* | 8/2004 | Tseng et al. ..................... 353/78 |
| 8,113,666 B2* | 2/2012 | Yamamoto et al. ............. 353/98 |
| 2004/0119952 A1* | 6/2004 | Chen .............................. 353/119 |
| 2006/0209272 A1* | 9/2006 | Ishino ............................ 353/119 |
| 2007/0070257 A1 | 3/2007 | Appleby et al. |
| 2007/0195441 A1 | 8/2007 | Aizawa et al. |
| 2009/0279055 A1* | 11/2009 | Amano ......................... 353/101 |
| 2012/0162870 A1* | 6/2012 | MacDonald et al. .... 361/679.01 |

FOREIGN PATENT DOCUMENTS

| | | |
|---|---|---|
| JP | 2008225028 A | 9/2008 |
| TW | 200712734 A | 4/2007 |

* cited by examiner

*Primary Examiner* — Sultan Chowdhury
(74) *Attorney, Agent, or Firm* — Muncy, Geissler, Olds & Lowe, P.C.

(57) ABSTRACT

An optical apparatus includes a support stand, an optical module, a reflective module, at least a first adjusting unit and at least a second adjusting unit. The support stand has a base and a back frame. The back frame is connected with the base and formed an inclination angle with the base. The optical module is disposed on the base. The reflective module is disposed on the back frame. The first adjusting unit is connected with the back frame and the base. The first adjusting unit moves the back frame so as to adjust the inclination angle. The second adjusting unit is disposed at the back frame and contacts against the reflective module. The second adjusting unit moves the reflective module so as to adjust a swinging angle of the reflective module.

10 Claims, 7 Drawing Sheets

OPTICAL APPARATUS

CROSS REFERENCE TO RELATED APPLICATIONS

This Non-provisional application claims priority under 35 U.S.C. §119(a) on Patent Application No(s). 201210198897.4 filed in People's Republic of China on Jun. 15, 2012, the entire contents of which are hereby incorporated by reference.

BACKGROUND OF THE INVENTION

1. Field of Invention

The present invention relates to an optical apparatus and, in particular, to an optical apparatus that can dynamically adjust the precision thereof.

2. Related Art

The commercial ultra-short-throw projector has the image magnification much larger than that of the common projector, so it needs longer light path and better precision of optical components to achieve the desired magnification and quality.

In order to provide the accurate projection path, the ultra-short-throw projector needs the casting member with high precision to carry and fix the relative optical components (e.g. the optical engine, optical lens or reflective mirror) so as to achieve the demands of optical quality. However, the manufacturer must seriously control the manufacturing processes and machines to achieve the demands of high precise casting members. This serious control makes the manufacturing cost of the casting member as well as the ultra-short-throw projector very expensive. Unfortunately, the expensive ultra-short-throw projector has bad market competitiveness and is easily eliminated from the market.

In order to reduce the manufacturing cost and increase the competitiveness of the ultra-short-throw projector, the casting member must be replaced by other approaches having the material and manufacturing with lower cost. However, these additional approaches usually cause bad precision of the optical apparatus, which leads to the poor image resolution of the projected images.

Therefore, it is an important subject to provide an optical apparatus that can solve the precision issue by dynamically adjusting.

SUMMARY OF THE INVENTION

In view of the foregoing, an objective of the present invention is to provide an optical apparatus that can solve the precision issue by dynamically adjusting and have lower manufacturing cost and higher product competitiveness.

To achieve the above objective, the present invention discloses an optical apparatus, which is a ultra-short-throw projector, including a support stand, an optical module, a reflective module, at least a first adjusting unit and at least a second adjusting unit. The support stand is a metal sheet or a casting member. Besides, the support stand has a base and a back frame, and an inclination angle is formed between the base and the back frame. The base substantially has a "⌐⌐" or inverted "U" shape as viewed from an optical axis.

The optical module is disposed on the base, and the reflective module is disposed on the back frame. The first adjusting unit is connected with the back frame and the base. The first adjusting unit moves the back frame so as to adjust the inclination angle. The second adjusting unit is disposed at the back frame and contacts against the reflective module. The second adjusting unit moves the reflective module so as to adjust a swinging angle of the reflective module. Herein, the first adjusting unit adjusts and fixes the inclination angle according to the image reflected by the reflective module, thereby fixing the reflective angle of the reflective module.

The first adjusting unit comprises a screw and a washer. By adjusting the screw and the washer, the inclination angle between the back frame and the base can be changed and fixed. Furthermore, the second adjusting unit comprises a screw and a connecter, and the screw contacts against the reflective module by the connecter.

In addition, the optical apparatus further comprises a plurality of supporting elements disposed on the base for contacting against a plane. Moreover, the optical module comprises an optical engine and an optical lens unit, and the reflective module comprises a reflective mirror. The optical engine emits at least one light beam and the light beam passes through the optical lens unit and is then projected on the reflective mirror. Then, the reflective mirror reflects the light beam to form an image.

As mentioned above, the optical apparatus of the invention comprises a support stand, an optical module, a reflective module, at least a first adjusting unit and at least a second adjusting module. The support stand has a base and a back frame, which is connected to the base and forms an in inclination angle with the base. The optical module is disposed on the base, and the reflective module is disposed on the back frame. The first adjusting unit moves the back frame so as to adjust the inclination angle, and the second adjusting unit moves the reflective module so as to adjust a swinging angle of the reflective module. Accordingly, the first and second adjusting units can dynamically adjust the inclination and swing angles so as to solve the precision issue of the support stand, so that the optical apparatus can have lower manufacturing cost and higher product competitiveness.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
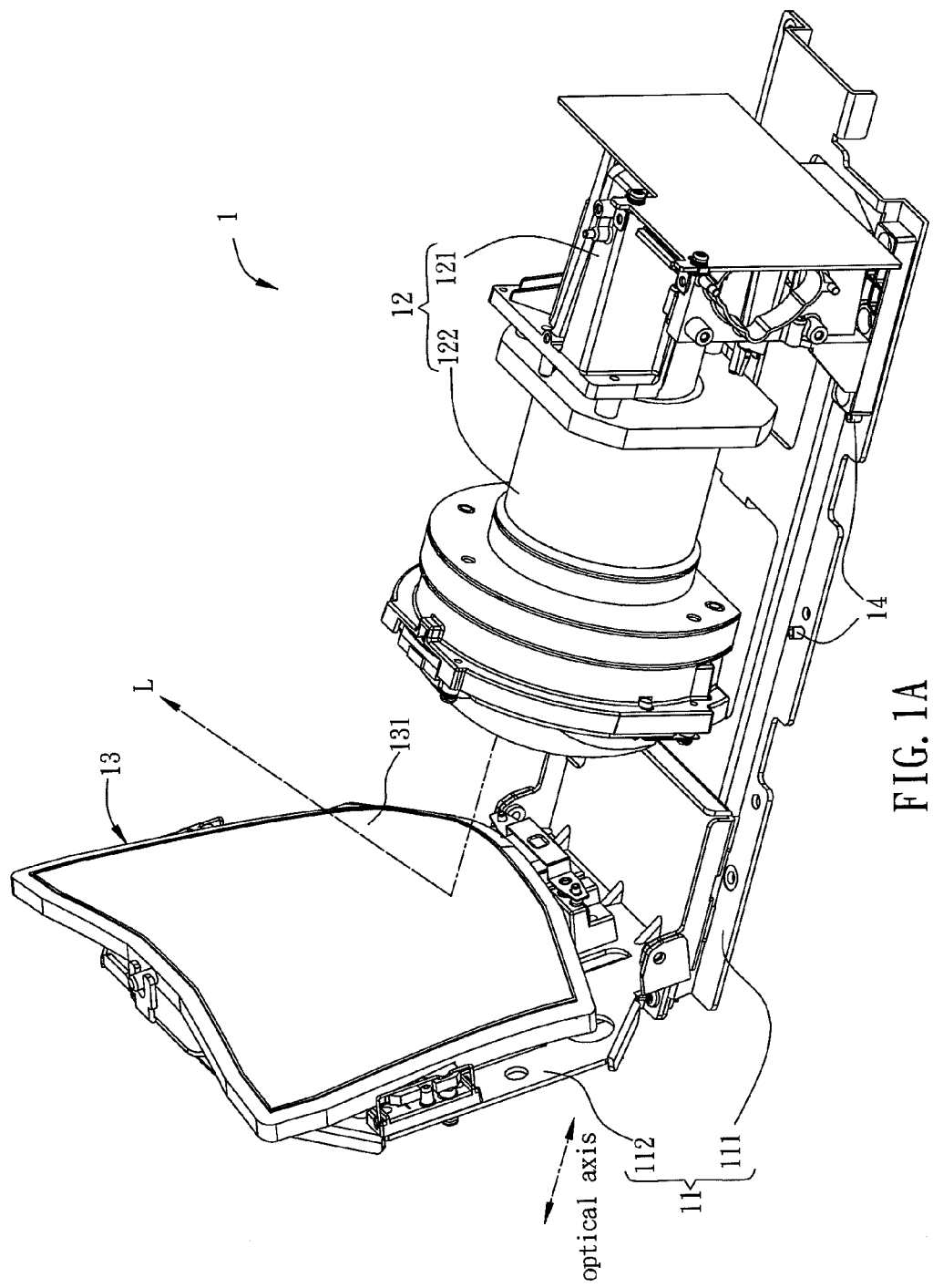
FIG. 1A and FIG. 1B are an assembled view and an exploded view, respectively, of an optical apparatus according to a preferred embodiment of the invention.
Figure 1B:
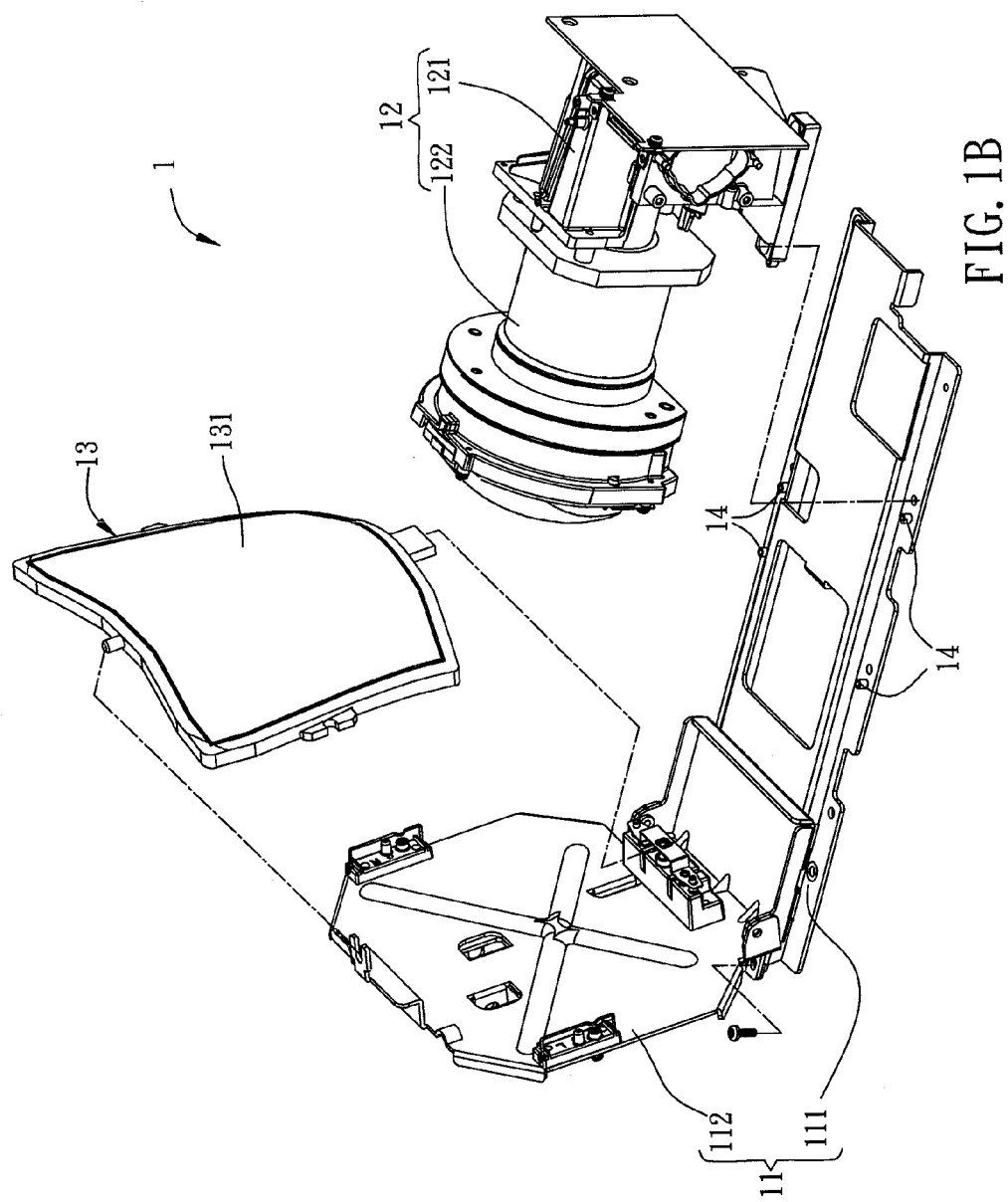

FIG. 1A and FIG. 1B are an assembled view and an exploded view, respectively, of an optical apparatus 1 according to a preferred embodiment of the invention.

Referring to FIGS. 1A and 1B, the optical apparatus 1 of the embodiment of the invention is, for example but not limited to, an ultra-short-throw projector and comprises a support stand 11, an optical module 12 and a reflective module 13. In addition, the optical apparatus 1 further comprises at least a first adjusting unit 15 and at least a second adjusting unit 16.

The support stand 11 is made of sheet metal or a casing member, and cooperates with the optical module 12 and the reflective module 13 in order to support the optical module 12 and the reflective module 13. Herein, the sheet metal has lower production cost, so it is able to increase the competitiveness of the optical apparatus 1. The support stand 11 can be made of galvanized steel sheet, hot rolled sheet steel, cold rolled sheet steel or cold rolled hot dip galvanized sheet steel and can be manufactured by cutting, bending, punching and extending. In this case, the support stand 11 is an example of galvanized steel sheet.

In this embodiment, the support stand 11 comprises a base 111 and a back frame 112, and the back frame 112 is connected to one side of the base 111. The optical module 12 is disposed on the base 111 along an optical axis and the reflective module 13 is disposed on the back frame 112. Herein, the optical module 12 is screwed onto the base 111 (not shown) and the reflective module 13 is locked on the back frame 112. The reflective module 13 includes a reflective mirror 131 (such as a convex mirror). In addition, the optical module 12 comprises an optical engine 121 and an optical lens unit 122. The optical engine 121 emits at least one light beam L, which passes through the optical lens unit 122 and then projected to the reflective module 13. Afterwards, the light beam L reflected by the reflective mirror 131 is projected on a screen (not shown) so as to form an image. In this embodiment, as shown in FIG. 1A, the direction of the optical axis is identical to the direction of the light beam L.

Figure 2A:
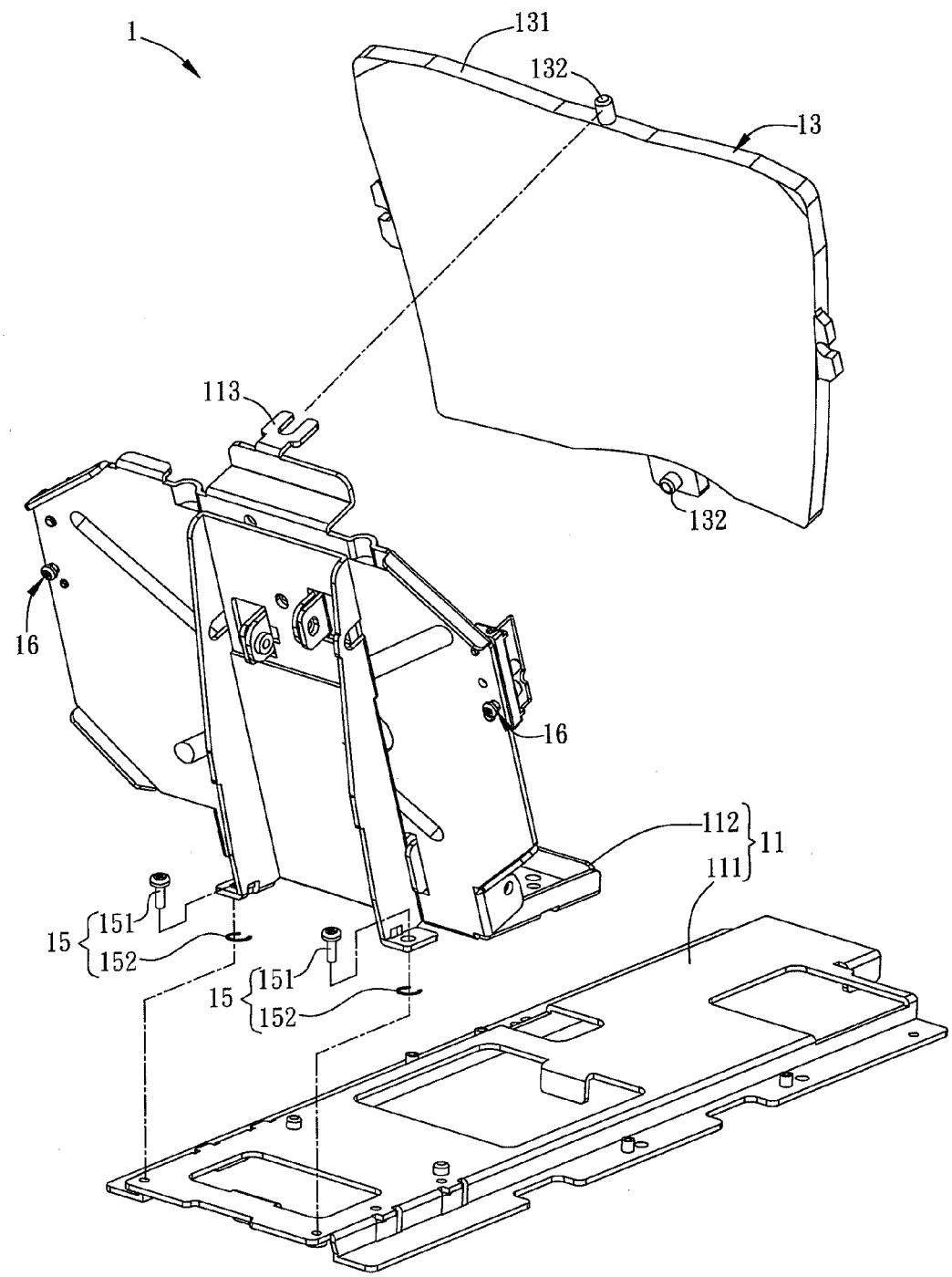
FIG. 2A to FIG. 2C are a partial exploded view and two partial assembled views of the optical apparatus according to the preferred embodiment the invention.
Figure 2B:
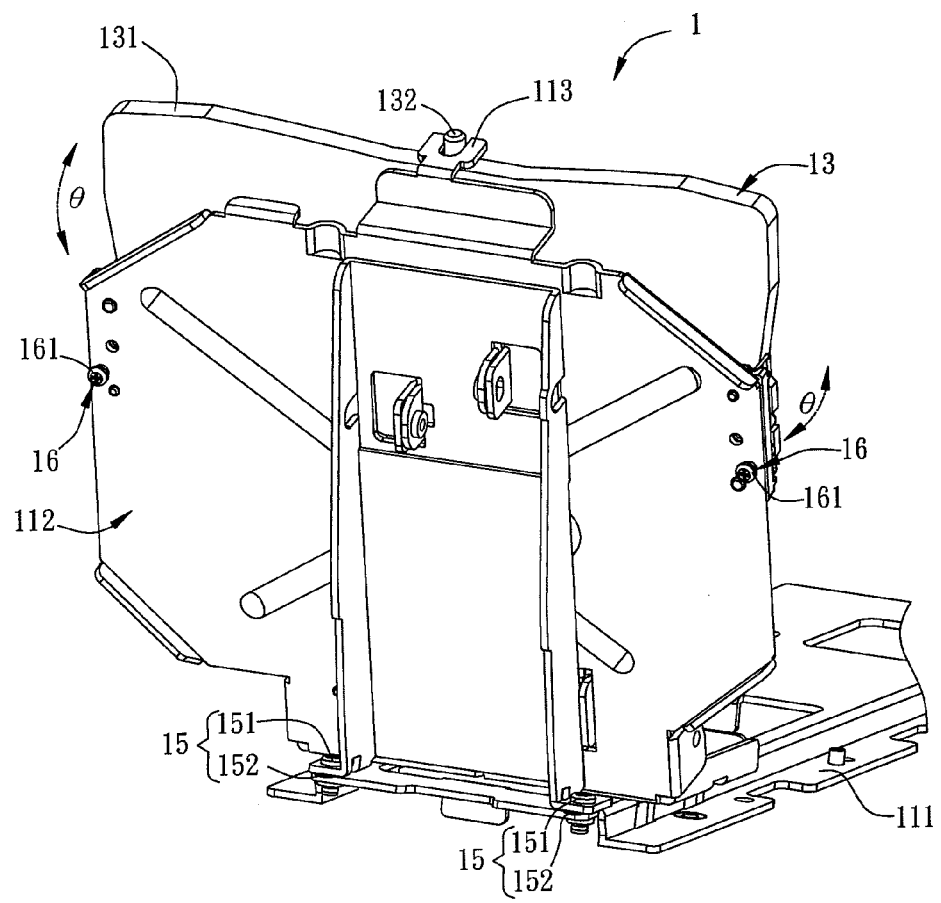
Figure 2C:
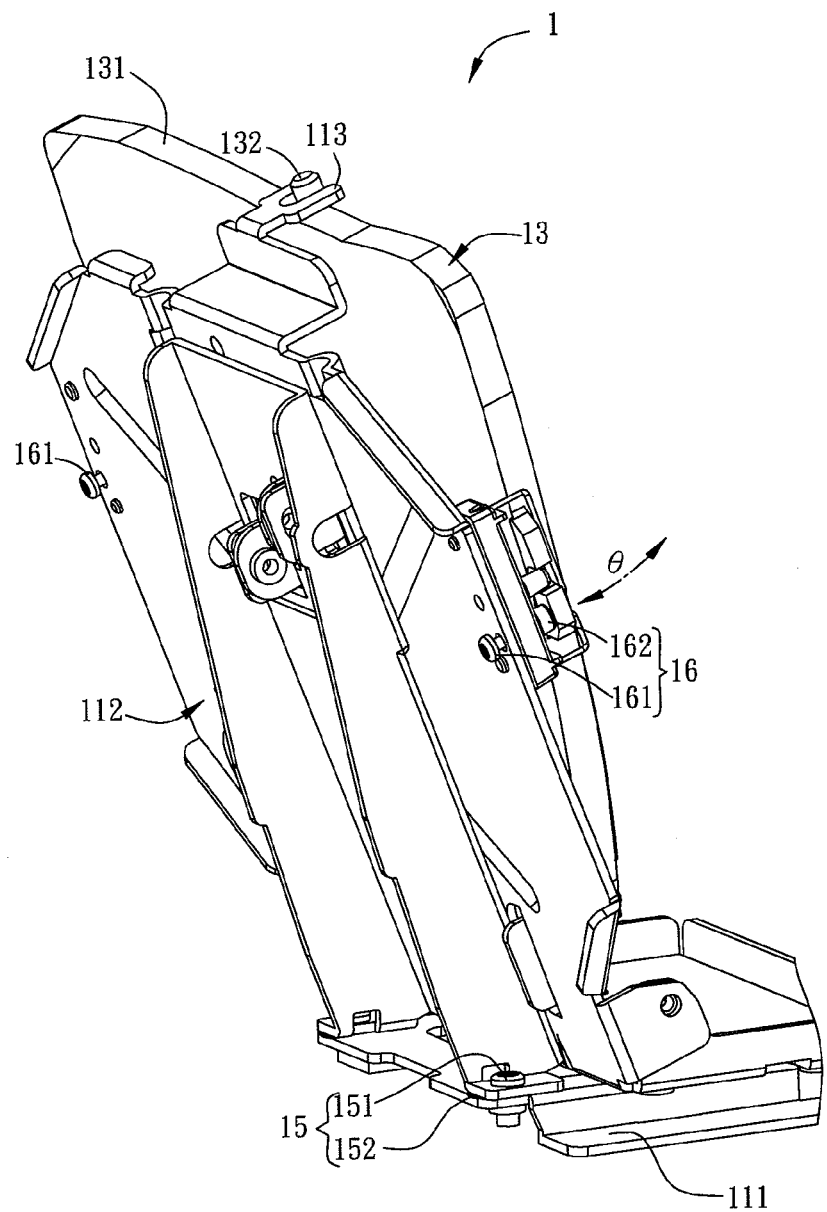

FIG. 2A to FIG. 2C are a partial exploded view and two partial assembled views of the optical apparatus 1 according to the embodiment of the invention.

Referring to FIG. 2A, the first adjusting unit 15 is connected with the back frame 112 and the base 111. The back frame 112 is connected to the base 111 via the first adjusting unit 15, and an inclination angle is formed between the back frame 112 and the base 111. In other words, the back frame 112 is obliquely disposed on the base 111 through the first adjusting unit 15. Thus, the inclination angle of the back frame 112 with respect to the base 111 can be adjusted by adjusting the first adjusting unit 15. In this embodiment, two first adjusting units 15 are adopted, and each of them includes a screw 151 and a washer 152 (C-shaped washer). The two first adjusting units 15 are able to adjust and fix the inclination angle according to the image reflected by the reflective mirror 131 of the reflective module 13, and fix the desired reflective angle between the back frame 112 and the base 111.

In more specific, referring to FIGS. 1, 2A and 2B, a user can control the light beam L emitted from the optical engine 121 to pass through the optical lens unit 122, to achieve the reflective module 13, and then to be reflected to the screen so as to display an image. Besides, the user can adjust the depth that the screw 151 is inserted into the screw hole of the back frame 112 according to the focus and resolution of the image reflected from the reflective module 13. This adjustment can control the gap between the back frame 112 and the base 111 so as to adjust the inclination degree (elevation angle) of the reflective module 13. To adjust the screw 151 inserted into the screw hole for obtaining better resolution of the image, the user can put a corresponding washer 152 in the gap between the back frame 112 and the base 111, and then screw the screw 151 tightly so as to fix the inclination angle between the back frame 112 and the base 111. Moreover, the elevation angle of the reflective mirror 131 of the reflective module 13 can be fixed. Accordingly, the elevation angle of the reflective module 13 can be dynamically adjusted so as to solve the precision problem caused by the structural rigidity of the support stand 11.

In addition, referring to FIGS. 2B and 2C, the second adjusting unit 16 is disposed on the back frame 112 and contacts against the reflective module 13. The second adjusting unit 16 can move the reflective module 13 so as to adjust a swing angle θ of the reflective module 13. In this embodiment, the reflective module 13 further has two protruding portions 132 connected to the top and bottom sides of the reflective mirror 131, and the back frame 112 further has two locking portions 113 disposed opposite to the protruding portions 132, respectively. The reflective module 13 can be disposed on the back frame 112 by connecting the protruding portions 132 with the locking portions 113. As shown in FIG. 2C, two second adjusting units 16 are adopted, and each of the second adjusting units 16 has a screw 161 and a connecter 162. Two screws 161 pass through two sides of the back frame 112, respectively, and contact against two opposite sides of the reflective module 13 through the connecters 162. Thus, by screwing the screws 161 to make a move of the connecters 162, the swing angle θ of the reflective module 13 is adjusted. As shown in FIGS. 2B and 2C, the reflective module 13 is swung about the protruding portion 132. Accordingly, it is feasible to obtain the image reflected from the reflective mirror 131 with better resolution by adjusting the second adjusting unit 16. Moreover, the swing angle θ of the reflective module 13 is able to be dynamically adjusted so as to solve the precision problem caused by the support stand 11 or other elements carried on. To be noted, the first adjusting unit 15 and the second adjusting unit 16 can be applied to either the support stand 11 made of metal sheet or the casting member for dynamically adjusting the reflective module 13 to solve the precision issue of the ultra-short-throw projector.

Figure 3A:
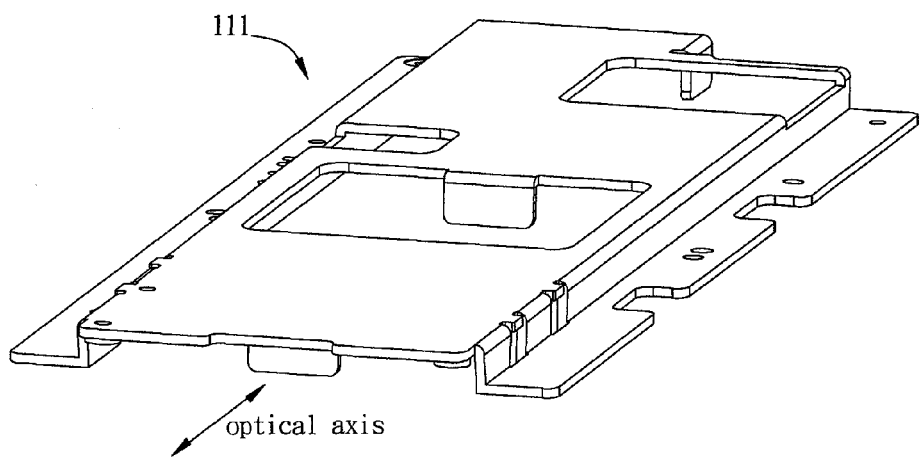
FIG. 3A and FIG. 3C are perspective views of different aspects of the base of the optical apparatus.
Figure 3B:
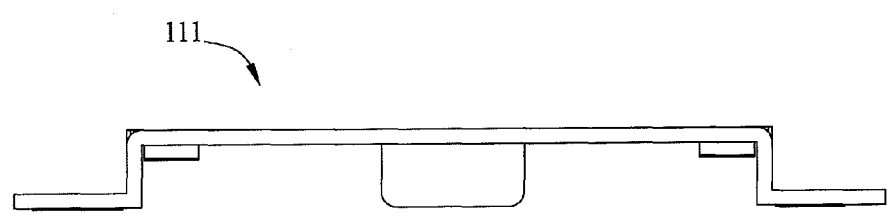
FIG. 3B and FIG. 3D are side views of the bases of FIG. 3A and FIG. 3C along the optical axis, respectively.
Figure 3C:
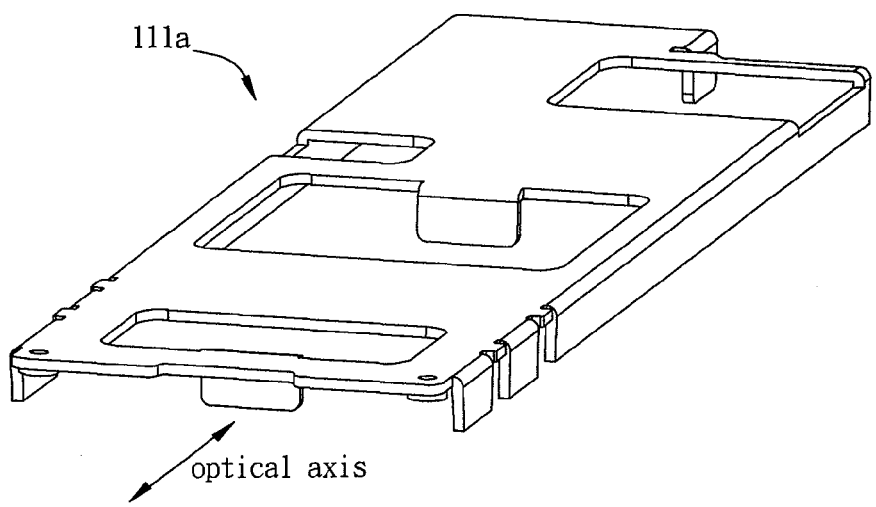
Figure 3D:
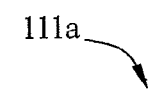

As shown in FIGS. 3A to 3D, the support stand 11 has strengthened structural rigidity and lower production cost than the casting member of the conventional ultra-short-throw projector. FIG. 3A and FIG. 3C are perspective views of different aspects of the bases 111 and 111a of the optical apparatus 1, and FIG. 3B and FIG. 3D are schematic views of the bases 111 and 111a of FIG. 3A and FIG. 3C as viewed from the optical axis, respectively.

Referring to FIGS. 3A and 3B, the base 111 substantially has a "⌐⌐" shape as viewed from the optical axis. Alternatively, referring to FIGS. 3C and 3D, the base 111a substantially has an inverted "U" shape as viewed from the optical axis. The base 111 with the "⌐⌐" shape or the base 111a with the inverted "U" shape can enhance the structural rigidity of the sheet metal so as to prevent the deformation of the base 111 or 111a as carrying the optical module 12 and remaining the precision of the optical apparatus 1.

With reference to FIG. 1B, the optical apparatus 1 further comprises a plurality of supporting elements 14 penetrating through the base 111 for contacting against a plane (e.g. a tabletop). In this embodiment, the supporting elements 14 are knock-out screws, and four supporting elements 14 are configured. The configuration of the supporting elements 14 can further enhance the structural rigidity of the base 111 so as to prevent the easy deformation of the metal sheet with poor rigidity. To be noted, if three supporting elements 14 are configured on the base 111, they are preferably arranged as the points of an isosceles triangle from the top view of the base 111.

In addition, the optical apparatus 1 may further comprise a casing (not shown), and the support stand 11, the optical module 12 and the reflective module 13 are all accommodated in the casing.

In summary, the optical apparatus of the invention comprises a support stand, an optical module, a reflective module, at least a first adjusting unit and at least a second adjusting module. The support stand has a base and a back frame, which is connected to the base and forms an in inclination angle with the base. The optical module is disposed on the base, and the reflective module is disposed on the back frame. The first adjusting unit moves the back frame so as to adjust the inclination angle, and the second adjusting unit moves the reflective module so as to adjust a swinging angle of the reflective module. Accordingly, the first and second adjusting units can dynamically adjust the inclination and swing angles so as to solve the precision issue of the support stand, so that the optical apparatus can have lower manufacturing cost and higher product competitiveness.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. An optical apparatus, comprising:
    a support stand having a base and a back frame, wherein the back frame is connected with the base and formed an inclination angle with the base;
    an optical module disposed on the base;
    a reflective module disposed on the back frame; and
    at least an adjusting unit connected with the back frame and the base, wherein the adjusting unit moves the back frame so as to adjust the inclination angle.

2. The optical apparatus of claim 1, wherein the support stand is a sheet metal or a casting element.

3. The optical apparatus of claim 1, wherein the adjusting unit comprises a screw passing through the back frame and the base, and a washer disposed between the back frame and the base.

4. The optical apparatus of claim 1, wherein the optical module comprises an optical engine and an optical lens unit, and the reflective module comprises a reflective mirror.

5. The optical apparatus of claim 1, wherein the optical apparatus is an ultra-short-throw projector.

6. An optical apparatus, comprising:
    a support stand having a base and a back frame, wherein the back frame is connected with the base and formed an inclination angle with the base;
    an optical module disposed on the base;
    a reflective module disposed on the back frame; and
    at least an adjusting unit connected with the back frame and contacting against the reflective module, wherein the adjusting unit moves the reflective module so as to adjust a swing angle of the reflective module.

7. The optical apparatus of claim 6, wherein the support stand is a sheet metal or a casting element.

8. The optical apparatus of claim 6, wherein the adjusting unit comprises a screw passing through the back frame and a connecter for connecting the screw and contacting against the reflective module.

9. The optical apparatus of claim 6, wherein the optical module comprises an optical engine and an optical lens unit, and the reflective module comprises a reflective mirror.

10. The optical apparatus of claim 6, wherein the optical apparatus is an ultra-short-throw projector.

* * * * *